US007154860B1

(12) United States Patent
Nanba

(10) Patent No.: US 7,154,860 B1
(45) Date of Patent: Dec. 26, 2006

(54) RADIO COMMUNICATION APPARATUS AND RADIO COMMUNICATION METHOD

(75) Inventor: Hideo Nanba, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 921 days.

(21) Appl. No.: 10/069,186

(22) PCT Filed: Nov. 24, 2000

(86) PCT No.: PCT/JP00/08302

§ 371 (c)(1),
(2), (4) Date: Feb. 14, 2002

(87) PCT Pub. No.: WO01/41370

PCT Pub. Date: Jun. 7, 2001

(30) Foreign Application Priority Data

Nov. 29, 1999 (JP) .................................. 11-337082

(51) Int. Cl.
*H04L 12/28* (2006.01)
(52) U.S. Cl. ...................... 370/254; 370/255; 709/223; 709/229
(58) Field of Classification Search .................... None
See application file for complete search history.

(56) References Cited

U.S. PATENT DOCUMENTS 6,590,928 B1 *  7/2003  Haartsen ..................... 375/134
6,980,524 B1 * 12/2005  Lu et al. ..................... 370/254

FOREIGN PATENT DOCUMENTS

| EP | 0 352 041 A2 | 1/1990 |
| JP | 9-186690 | 7/1997 |
| JP | 10-98469 | 4/1998 |
| WO | WO 99/14897 | 3/1999 |

* cited by examiner

*Primary Examiner*—Doris H. To
*Assistant Examiner*—Robert W. Wilson
(74) *Attorney, Agent, or Firm*—David G. Conlin; Steven M. Jensen; Edwards Angell Palmer & Dodge LLP

(57) ABSTRACT

A radio communication apparatus and a radio communication apparatus can reduce a communication bandwidth required to manage topology maps, can control transmission and reception timings of information for managing the topology maps, and can prevent the information from being broken by collision. The radio communication apparatus includes means (14) for requesting topology map data which is bit field data formed on the basis of a communication state between the terminals and the constituent terminal list and which indicates the communication state between the terminals at the present viewed from the corresponding terminal from the designated terminal, means (3) receiving the request of the topology map data, means (10) for deciding whether the request of the topology map data is for its own terminal or not, means (13) for, when the request of the topology map data is for its own terminal, transmitting the topology map data viewed from its own terminal, and means (11) for, when the request of the topology map data is not for its own terminal, receiving topology map data transmitted from another terminal from which topology map data is requested to reflect the topology map data on the communication state between the terminals stored in its own terminal.

3 Claims, 14 Drawing Sheets

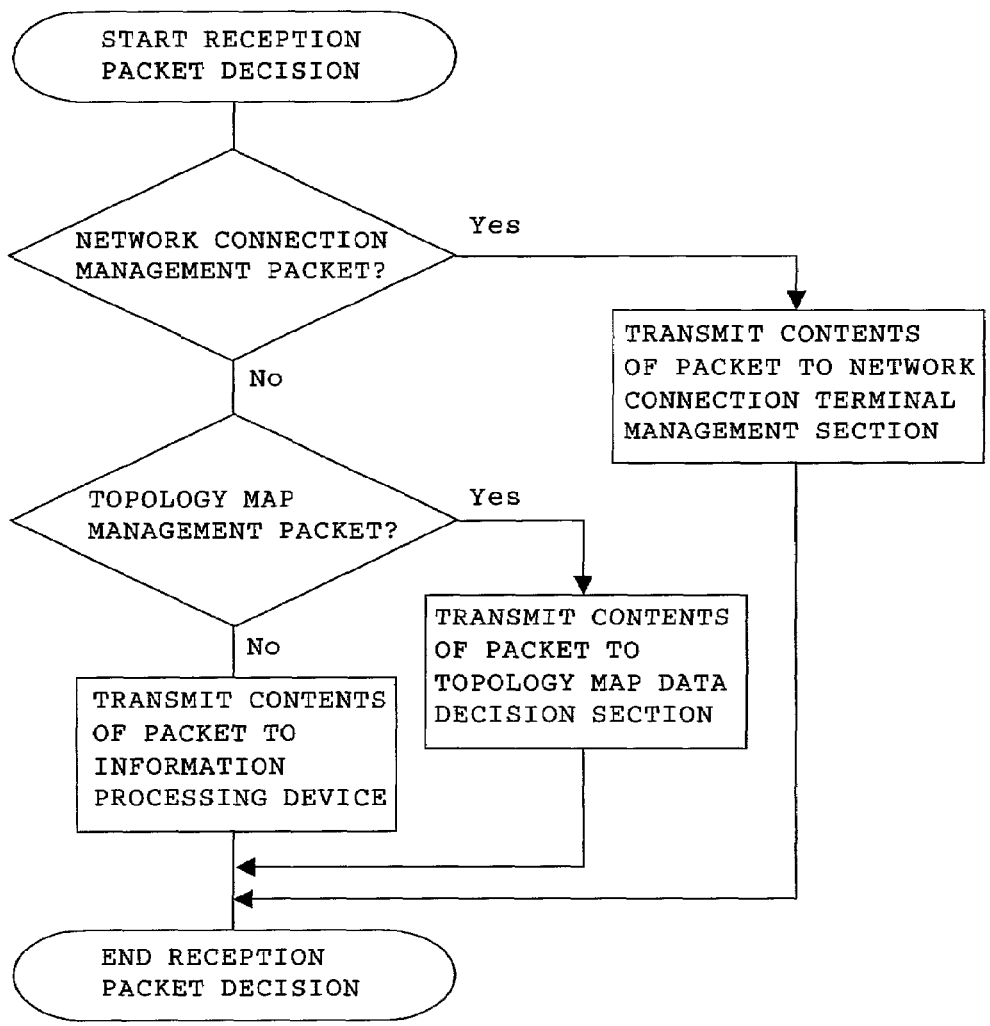

FIG.11

| | RECEPTION-SIDE TERMINAL INDEX | | | |
|---|---|---|---|---|
| | TERMINAL A | TERMINAL B | TERMINAL C | TERMINAL D |
| TRANSMISSION-SIDE TERMINAL INDEX / TERMINAL A | - | OK | OK | OK |
| TERMINAL B | OK | - | OK | NG |
| TERMINAL C | OK | OK | - | NG |
| TERMINAL D | OK | NG | OK | - |

FIG.12

| | RECEPTION-SIDE TERMINAL INDEX | | | | |
|---|---|---|---|---|---|
| | TERMINAL A | TERMINAL B | TERMINAL C | TERMINAL D | TERMINAL E |
| TRANSMISSION-SIDE TERMINAL INDEX / TERMINAL A | - | OK | OK | OK | Unknown |
| TERMINAL B | OK | - | OK | NG | Unknown |
| TERMINAL C | OK | OK | - | NG | Unknown |
| TERMINAL D | OK | NG | OK | - | Unknown |
| TERMINAL E | Unknown | Unknown | Unknown | Unknown | - |

FIG.13

| | RECEPTION-SIDE TERMINAL INDEX | | | | |
|---|---|---|---|---|---|
| | TERMINAL A | TERMINAL B | Non used | TERMINAL D | TERMINAL E |
| TRANSMISSION-SIDE TERMINAL INDEX / TERMINAL A | - | OK | Non used | OK | Unknown |
| TERMINAL B | OK | - | Non used | NG | Unknown |
| Non used | Non used | Non used | - | Non used | Non used |
| TERMINAL D | OK | NG | Non used | - | Unknown |
| TERMINAL E | Unknown | Unknown | Non used | Unknown | - |

|  |  | RECEPTION-SIDE TERMINAL INDEX | | | | |
|---|---|---|---|---|---|---|
|  |  | TERMINAL A | TERMINAL B | TERMINAL C | TERMINAL D | TERMINAL E |
| TRANSMISSION-SIDE TERMINAL INDEX | TERMINAL A | - | OK | OK | NG | NG |
|  | TERMINAL B | OK | - | OK | OK | OK |
|  | TERMINAL C | OK | OK | - | OK | NG |
|  | TERMINAL D | OK | OK | OK | - | NG |
|  | TERMINAL E | OK | OK | NG | NG | - |

RADIO COMMUNICATION APPARATUS AND RADIO COMMUNICATION METHOD

TECHNICAL FIELD

The present invention relates to a radio communication apparatus and a radio communication method which dynamically seizes communication states between a plurality of mobile terminals constituting a radio network and which dynamically changes communication paths depending on the communication states between the terminals at the present.

BACKGROUND ART

In general, in a radio communication network in which a plurality of mobile communication terminals participate, when communication is to be directly established between terminals, the terminals must know whether the communication between the terminals which desire communication therebetween with some method can be established or not. This is because a direct wave may not reach the terminals due to some obstacle between the terminals when the terminals are located at such positions that the obstacle exists therebetween.

The terminals seize connection states between the terminals which change with time, i.e., a topology map. When the terminals cannot directly establish communicate with each other, the terminals try to continue the communication by using a method which causes another terminal or the like to relay a radio wave.

As shown in FIG. 17, this topology map describes communication states between the terminals constituting a radio communication network therein. In bi-directional recording of a communication state between terminals, when the number of terminals is represented by n, elements the number of which is $n^2-n$ are necessary.

In FIG. 17, OK indicates that transmission and reception between the corresponding terminals can be performed, and NG indicates that the transmission or reception or both the transmission and reception between the corresponding terminals cannot be performed.

In order to manage the topology maps, at least one management station for managing the topology maps is arranged, and each terminal obtains the topology map from the management station. As another method, the management station of the topology map periodically broadcasts the topology map, and each terminal receives the broadcasted topology map.

As still another method, Japanese Patent Application Laid-Open No. 9-186690 proposes a radio communication system in which identification codes can be transmitted and received between communication apparatuses without arranging a special management apparatus for managing the identification codes of a large number of radio communication apparatuses.

In this radio communication system, one terminal broadcasts an identification code list in which its own code and the identification codes of all the terminals stored by the corresponding terminal are described, and a terminal which receives an identification code list in which its own identification code is not described broadcasts an identification code list in which its identification code and the identification codes of all the other terminals stored in the corresponding terminal.

After a terminal which receives an identification code list which is not stored in the corresponding terminal stores the identification codes of the identification code list, the terminal broadcasts an identification code list in which its own identification code and the identification codes of all the other terminals stored in the corresponding terminal. In this manner, terminals can transmit and receive identification to/from each other. This operation is repeated every predetermined period of time, so that the latest identification code list is used as a topology map.

However, in the method of obtaining a topology map from a topology map management station or causing a topology map management station to broadcast a topology map, when the number of terminals which are accommodated in the same network increases, the size of the topology map exponentially increases.

Accordingly, traffic required managing the topology map also exponentially increase. For this reason, each time the topology map is transmitted, a communication bandwidth which can be used in communication may be compressed disadvantageously.

For example, in a system in which the number of accommodated terminals is 4, a communication state between terminals is represented by 1 byte, it is assumed that the size of a topology map representing bi-directional communication states between these terminals 12-byte (=4^2−4). In this case, the number of accommodated terminals is doubled, i.e., 8, the size of the topology map is 56-byte (=8^2−8).

When the number of accommodated terminals is trebled, i.e., 12, the size of the topology map is 132-byte (=12^2−12) Similarly, as the number of accommodated terminals increases in almost proportion to the square of a ratio of the numbers of accommodated terminals.

In addition, the system described in Japanese Patent Application Laid-Open No. 9-186690 uses a so-called contention type access method. The contention type access method includes various methods based on CSMA (Carrier Sense Multiple Access) These methods are made on the basis of the following fact. That is, a terminal monitors a communication channel for a predetermined period of time, and uses the channel when the communication channel is not used by other terminals.

For this reason, when a plurality of terminals try to use a communication channel at the same time, a terminal which can use the communication channel cannot easily specified. When the terminals use the communication terminal at almost the same time, the terminals collide with each other in communication, and the communication contents may be damaged.

In order to avoid this collision, a method of selecting a period of time from time when the channel is idle and time when communication is started in the channel at random is generally used. However, in such a case, a time until the communication is started is wasted, and communication start time cannot be easily specified.

As described above, in the method described in Japanese Patent Application Laid-Open No. 9-186690, a time until each terminal transmits an identification code list is not determined, and a problem that a time until the identification code list is propagated to all the terminals cannot be specified is posed.

As the number of stations constituting a network increases, identification code lists easily collide with each other in transmission of the identification code lists. As a result of the collision, a code list disappears, and a correct topology map cannot be obtained. In addition, when the number of terminals described in the identification code list increases, the identification code list is elongated accordingly. A time required to change identification code lists is elongated disadvantageously.

The present invention has been made in consideration of the above problems, and has as its object to provide a radio communication apparatus and a radio communication method which can reduce a communication bandwidth required to manage topology maps and which can control a transmission/reception timing of information for managing the topology maps to prevent the information from being broken by collision of information.

DISCLOSURE OF THE INVENTION

According to the present invention, a radio communication apparatus which dynamically seizes a communication state between a plurality of mobile terminals constituting a radio network and which dynamically changes communication paths depending on a communication state between the terminals at the present, includes: means for holding a constituent terminal list formed on the basis of the number of terminals connected to the radio network at the present and identifiers of the terminals; means for sequentially designating the terminals connected to the radio network; means for requesting topology map data which is bit field data formed on the basis of a communication state between the terminals and the constituent terminal list and which indicates the communication state between the terminals at the present viewed from the corresponding terminal from the designated terminal; means for receiving the request of the topology map data; means for deciding whether the request of the topology map data is for its own terminal or not; means for, when the request of the topology map data is for its own terminal, transmitting the topology map data viewed from its own terminal; and means for, when the request of the topology map data is not for its own terminal, receiving topology map data transmitted from another terminal from which topology map data is requested to reflect the topology map data on the communication state between the terminals stored in its own terminal.

According to the present invention, a radio communication method which dynamically seizes a communication state between a plurality of mobile terminals constituting a radio network and which dynamically changes communication paths depending on a communication state between the terminals at the present, includes: the step of holding a constituent terminal list formed on the basis of the number of terminals connected to the radio network at the present and identifiers of the terminals; the step of sequentially designating the terminals connected to the radio network; the step of requesting topology map data which is bit field data formed on the basis of a communication state between the terminals and the constituent terminal list and which indicates the communication state between the terminals at the present viewed from the corresponding terminal from the designated terminal; the step of receiving the request of topology map data transmitted from another terminal to reflect the topology map data on the communication state between the terminals stored in its own terminal.

According to the present invention, a radio communication method which dynamically seizes a communication state between a plurality of mobile terminals constituting a radio network and which dynamically changes communication paths depending on a communication state between the terminals at the present, includes: the step of holding a constituent terminal list formed on the basis of the number of terminals connected to the radio network at the present and identifiers of the terminals; the step of receiving a request of topology map data which is bit field data formed on the basis of a communication state between the terminals and the constituent terminal list and which indicates the communication state between the terminals at the present viewed from the corresponding terminal from the terminal; the step of deciding whether the request of the topology map data is for its own terminal or not; the step of, when the request of the topology map data is for its own terminal, transmitting the topology map data viewed from its own terminal; and the step of, when the request of the topology map data is not for its own terminal, receiving topology map data transmitted from another terminal from which topology map data is requested to reflect the topology map data on the communication state between the terminals stored in its own terminal.

BRIEF DESCRIPTION OF THE DRAWINGS

FIG. 2 is a diagram for explaining a list of the classifications and types of packets.

FIG. 3 is a flow chart showing an operation of a reception packet decision section in the radio communication apparatus according to the present invention.

FIG. 11 is a diagram for explaining an example of an internal state of a communication state storage memory in the radio communication apparatus according to the present invention.

FIG. 12 is a diagram for explaining an example of an internal state of the communication state storage memory when a terminal in the radio communication apparatus according to the present invention is added.

FIG. 13 is a diagram for explaining an example of an internal state of the communication state storage memory when a terminal in the radio communication apparatus is erased.

BEST MODE FOR CARRYING OUT THE INVENTION

An embodiment of a radio communication apparatus and a radio communication method according to the present invention will be described below with reference to FIGS. 1 to 18.

Figure 1:
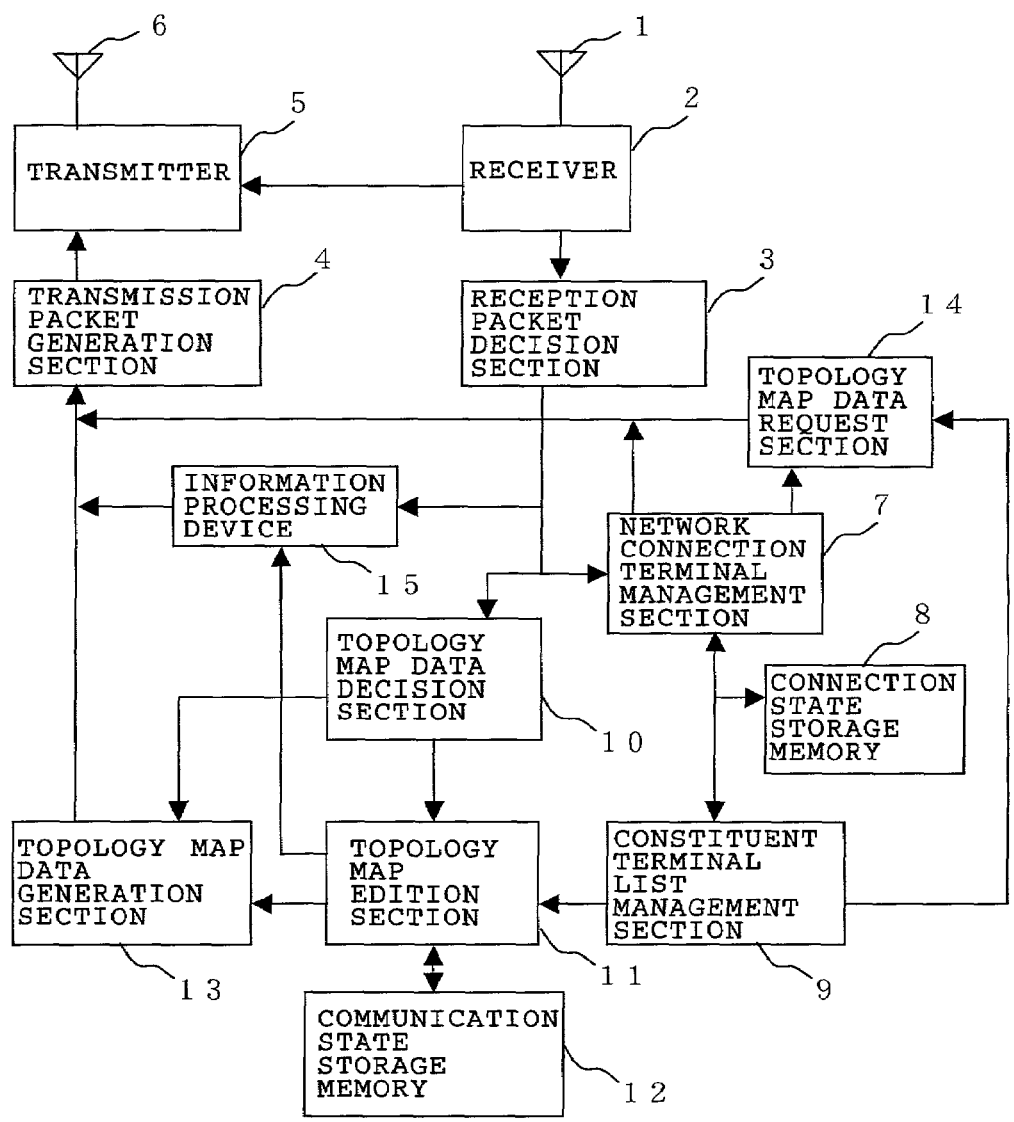
FIG. 1 is a schematic functional block diagram showing a configuration in a radio communication apparatus according to the present invention.

FIG. 1 is a functional block diagram showing a configuration of the radio communication apparatus according this embodiment. In FIG. 1, reference numeral 1 denotes a reception antenna; 2, a receiver which receives only a radio wave used in a network from radio waves received through the reception antenna 1 and which demodulates the received radio wave to form a packet; and 3, a reception packet decision section 3 which decides the type of the received packet demodulated by the receiver 2 and which distributes the received packet to a necessary block.

Reference numeral 4 denotes a transmission packet generation section which packets various types of transmission data transmitted from respective sections and which transmits the packet to a transmitter 5; and reference numeral 5 denotes a transmitter which confirms that other terminals do not perform transmission through the receiver 2, which modulates a transmission packet transmitted from the transmission packet generation section 4, and which transmits the transmission packet from a transmission antenna 6.

Reference numeral 7 denotes a network connection terminal management section which manages terminals connected to the network on the basis of a network connection management packet transmitted from the reception packet decision section 3; and reference numeral 8 denotes a connection state storage memory which stores information of terminals connected to the network at the present therein.

Reference numeral 9 denotes a constituent terminal list management section which manages a constituent terminal list indicating all terminals connected to the network at the present with appropriate reference to the connection state storage memory 8; and reference numeral 10 denotes a topology map data decision section which instructs a topology map edition section 11 to generate a topology map on the basis of a topology map management packet transmitted from the reception packet decision section 3 by using a constituent terminal list from the constituent terminal list management section 9 and which instructs a topology map data generation section 13 to generate topology map data.

Reference numeral 11 denotes a topology map edition section which appropriately edits the contents of a communication state storage memory 12 on the basis of an output from the constituent terminal list management section 9 and an instruction from the topology map data decision section 10 to manage topology maps at the present; and reference numeral 13 denotes a topology map data generation section which generates topology map data from the topology map output from the topology map edition section 11 by an instruction from the topology map data decision section 10 and which transmits the topology map data to the transmission packet generation section 4.

Reference numeral 14 denotes a topology map data request section which requests topology map data by an instruction from the network connection terminal management section 7 with reference to the network connection terminal management section 7; and reference numeral 15 denotes an information processing device which decides whether a destination terminal can perform direct communication on the basis of the topology map from the topology map edition section 11 and which, when it is decided that the destination terminal cannot perform direct communication, selects a terminal which can perform direct communication to perform a process of requesting the terminal to relay a radio wave.

An operation of the radio communication apparatus constituted as described above will be described below. The receiver 2 receives only a radio wave used in the network from radio waves received through the reception antenna 1 and demodulates the radio wave to cut a packet out.

The cut packet is transmitted to the reception packet decision section 3, and the type of the packet is decided. The packet is transmitted to the network connection terminal management section 7, the topology map data decision section 10, or the information processing device 15.

The types of reception packets, as shown in FIG. 2, are roughly classified into a network connection management packet, a topology map management packet, and other packets. The network connection management packet is constituted by a network management beacon packet, a network connection request packet, a network disconnection request packet, and a constituent terminal list packet. The topology map management packet is constituted by a topology map data request packet and a topology map data packet.

A type deciding process for a reception packet in the reception packet decision section 3 will be described below with reference to the flow chart in FIG. 3. When the reception packet is a network connection management packet, the contents of the network connection management packet are transmitted to the network connection terminal management section 7.

When the reception packet is a topology map management packet, the contents of the topology map management packet are transmitted to the topology map data decision section 10. When the reception packet is not a network connection management packet or a topology map management packet, the reception packet is transmitted as another packet to the information processing device 15.

The transmission packet generation section 4 packets requested data and transmits the packet to the transmitter 5. The transmitter 5 confirms that the receiver 2 does not receive any data and then modulates the packet data generated by the transmission packet generation section 4 to transmit the packet data from the transmission antenna 6.

The network connection terminal management section 7 and the constituent terminal list management section 9 have two modes, i.e., a master mode and a slave mode. Only one terminal has the network connection terminal management section 7 which is set in the master mode. In the other terminals, the network connection terminal management sections 7 and the constituent terminal list management sections 9 are set in the slave mode.

Figure 4:
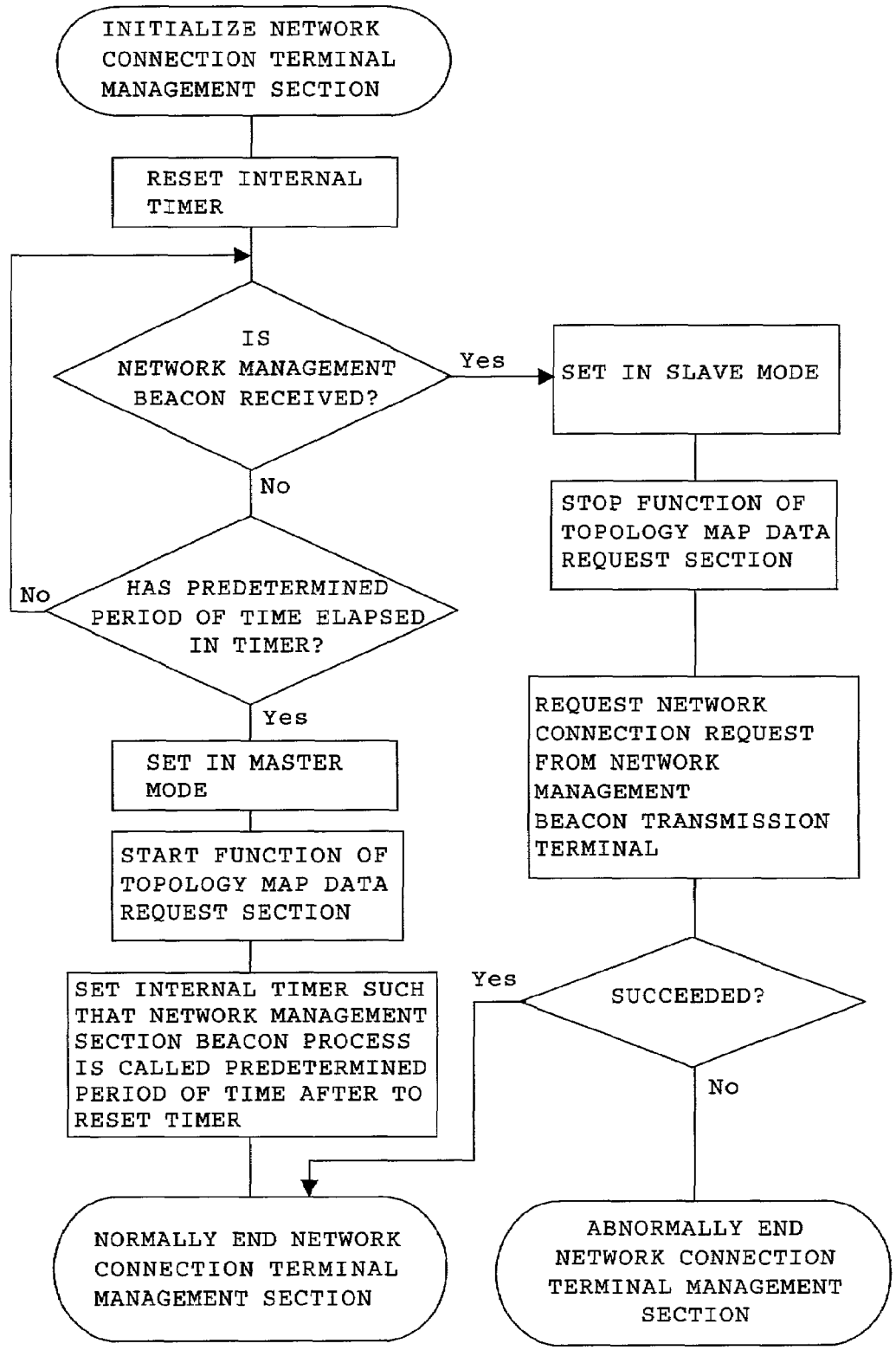
FIG. 4 is a flow chart showing an initializing operation of a network connection terminal management section in the radio communication apparatus.

A mode setting process in the network connection terminal management section 7 will be described below with reference to the flow chart in FIG. 4. After a power supply is turned on, or after initialization is performed for another reason, an output from the reception packet decision section 3 is monitored for a predetermined period of time by using an internal timer in the network connection terminal management section 7.

In the predetermined period of time, if a network management beacon packet from the reception packet decision section 3 is not detected, the network connection terminal management section 7 and the constituent terminal list management section 9 are set in the master mode. The function of the topology map data request section 14 is started, and a network management beacon is transmitted to the transmission packet generation section 4.

When the network management beacon transmitted from another terminal is detected within the period of time, the network connection terminal management section 7 and the constituent terminal list management section 9 shift to the slave mode, and the function of the topology map data request section 14 is stopped. A transmission terminal of the network management beacon is requested to be connected to the network.

Figure 5:
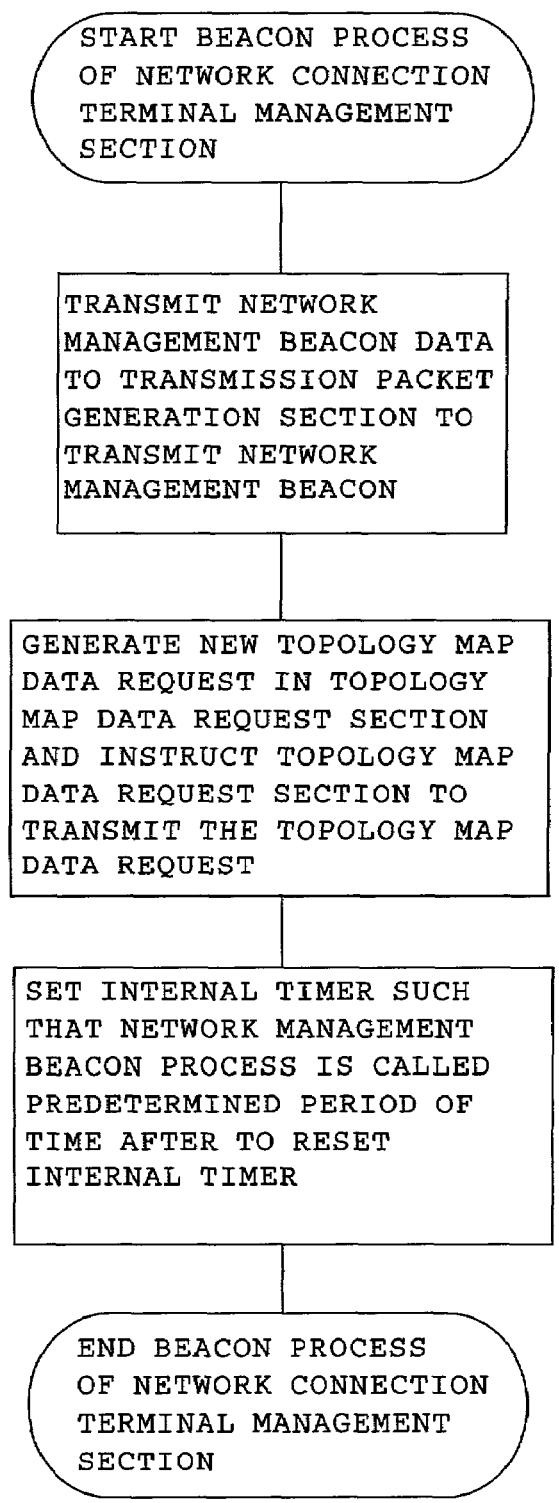
FIG. 5 is a flow chart showing a beacon process of the network connection terminal management section in the radio communication apparatus according to the present invention.

The network management beacon process in the network connection terminal management section 7 is performed as shown in the flow chart in FIG. 5. After the network management beacon packet is transmitted by using the transmission packet generation section 4, an instruction is output to the topology map data request section 14 to transmit a new topology map data request packet.

Thereafter, the internal timer in the network connection terminal management section 7 makes such a setting that the network management beacon process in the network connection terminal management section 7 is started again.

Figure 6:
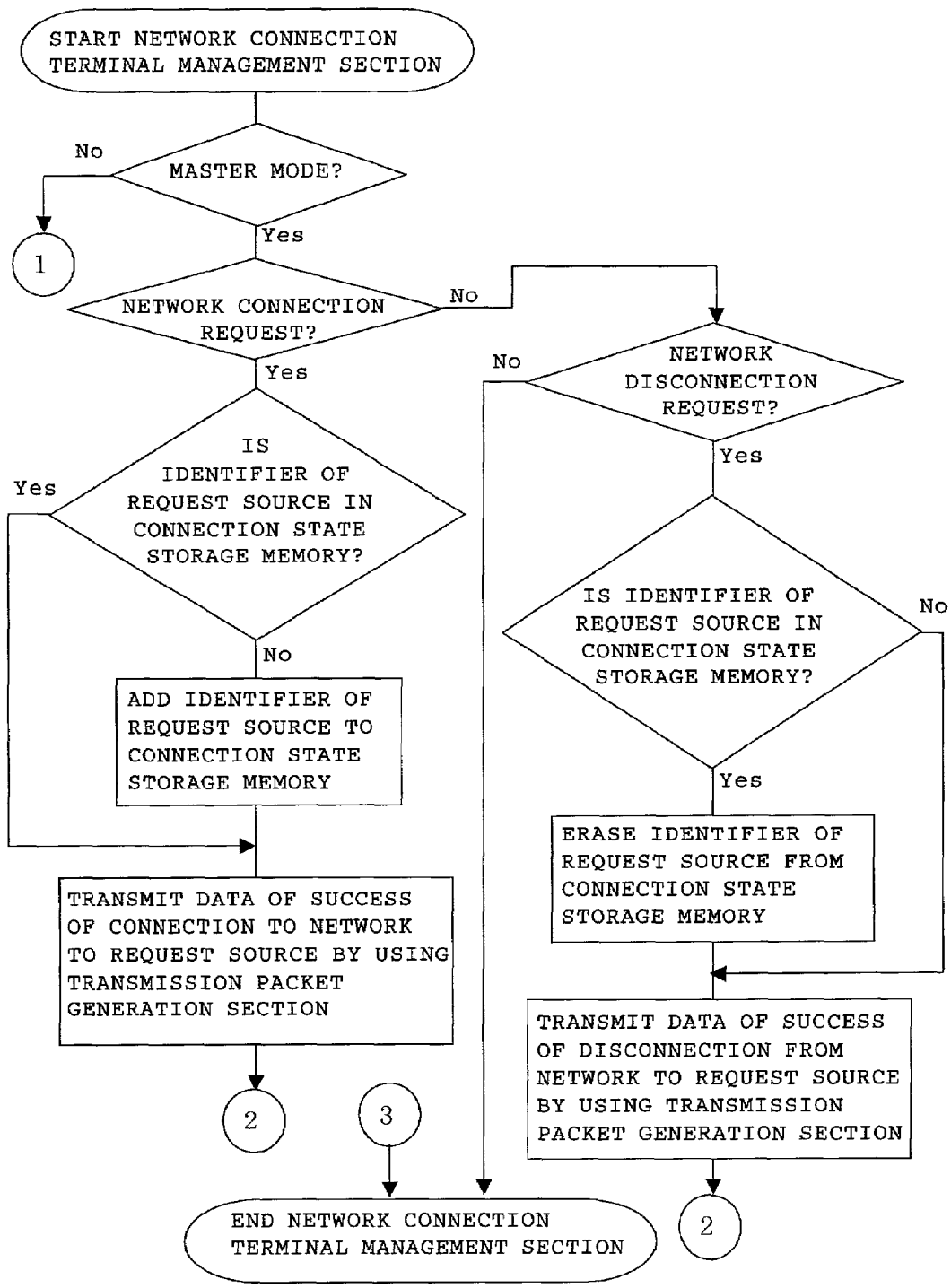
FIG. 6 is a flow chart showing normal processes of the network connection terminal management section in the radio communication apparatus according to the present invention.
Figure 7:
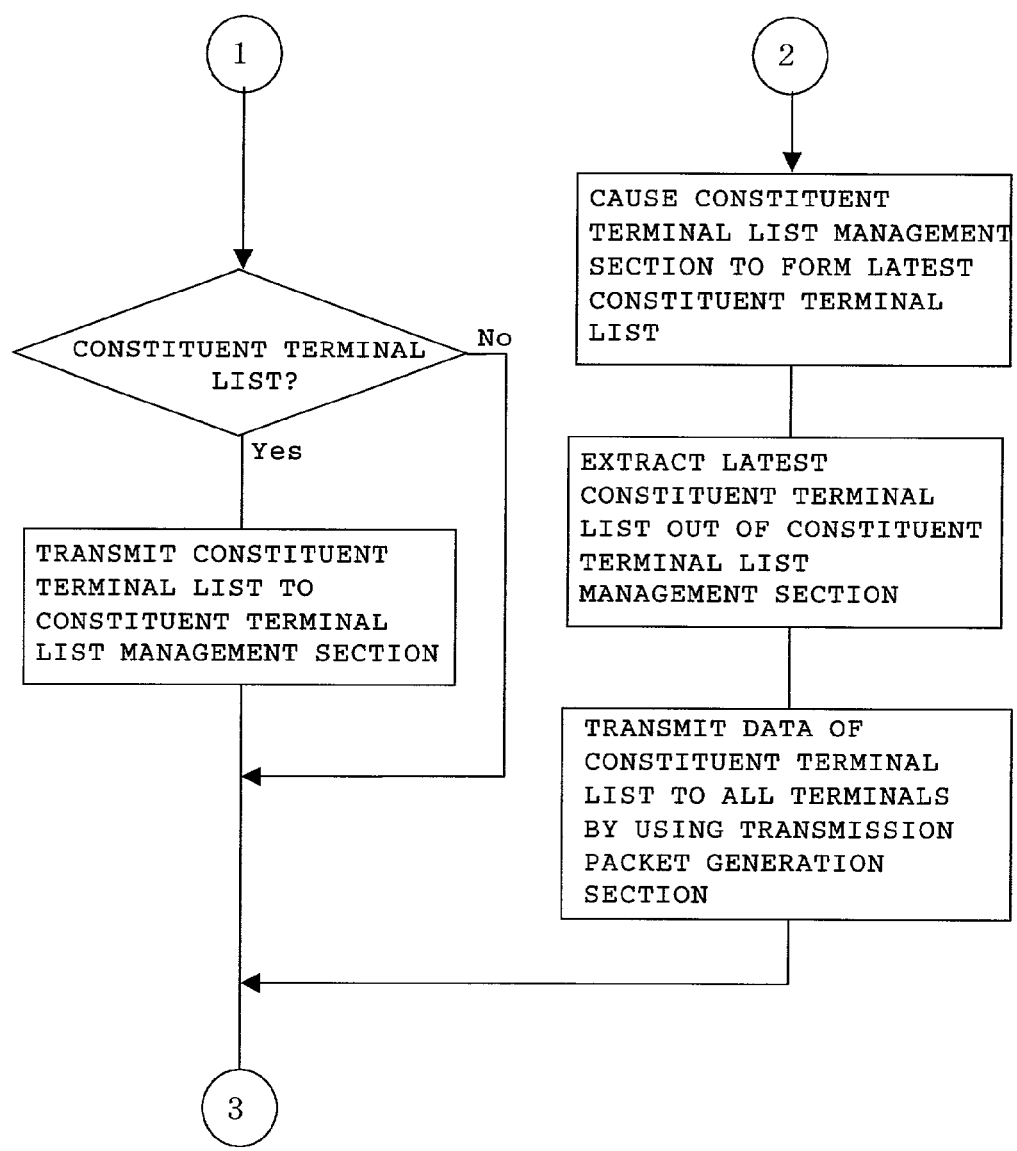
FIG. 7 is a flow chart showing normal processes of the network connection terminal management section in the radio communication apparatus according to the present invention.

An operation of the network connection terminal management section 7 will be described below with reference to the flow charts in FIGS. 6 and 7. When a packet output from the reception packet decision section 3 is a network connection management packet, the contents of the network connection management packet are transmitted to the network connection terminal management section 7.

When the network connection terminal management section 7 is set in the master mode, and when the network connection management packet is a connection request packet to the network, it is checked whether the identifier of a terminal which transmits the packet is recorded on the connection state storage memory 8 or not. If the identifier is not recorded, the identifier of the terminal is recorded on the connection state storage memory 8. This identifier is uniquely assigned to a terminal in the network. The terminals in the network can be discriminated from each other by the identifiers.

Thereafter, no matter whether the identifier is recorded on the connection state storage memory 8 or not, a network connection success data is transmitted to a connection request source. In this manner, even though a terminal cannot recognize that the network connection process is completed, i.e., a terminal makes a connection request again after the terminal fails in reception of the network connection success data from the terminal set in the master mode, the network connection terminal management section 7 can cope with the terminal which makes the connection request without recording a new identifier.

When the network connection terminal management section 7 is set in the master mode, and when the network connection management packet is a disconnection request packet from the network, it is checked whether the identifier of a terminal which transmits the disconnection request packet is recorded on the connection state storage memory 8 or not. If the identifier is recorded, the identifier of the terminal which transmits the packet is erased from the connection state storage memory 8.

Thereafter, no matter whether the identifier is erased from the connection state storage memory 8 or not, a network disconnection success data is transmitted to a disconnection request source. In this manner, even though a terminal cannot recognize that the network disconnection process is completed, i.e., a terminal makes a disconnection request again after the terminal fails in reception of the network disconnection success data from the terminal set in the master mode, the network connection terminal management section 7 can cope with the terminal which makes the disconnection request.

After the network connection terminal management section 7 transmits the connection success data and the disconnection success data, the network connection terminal management section 7 causes the constituent terminal list management section 9 to form the latest constituent terminal list, extracts the latest constituent terminal list from the constituent terminal list management section 9, and transmits the latest constituent terminal list to all the terminals connected to the network by using the transmission packet generation section 4.

The terminal in which the network connection terminal management section 7 and the constituent terminal list management section 9 are set in the master mode neglects the network connection management packet unless the network connection management packet is a connection request packet or a disconnection request packet. A terminal in which the network connection terminal management section 7 and the constituent terminal list management section 9 are set in the slave mode transmits a constituent terminal list to the constituent terminal list management section 9 when the contents of the network connection management packet correspond to the network connection management list. In cases other than the above cases, a special operation is not performed to the connection state storage memory 8.

Figure 8:
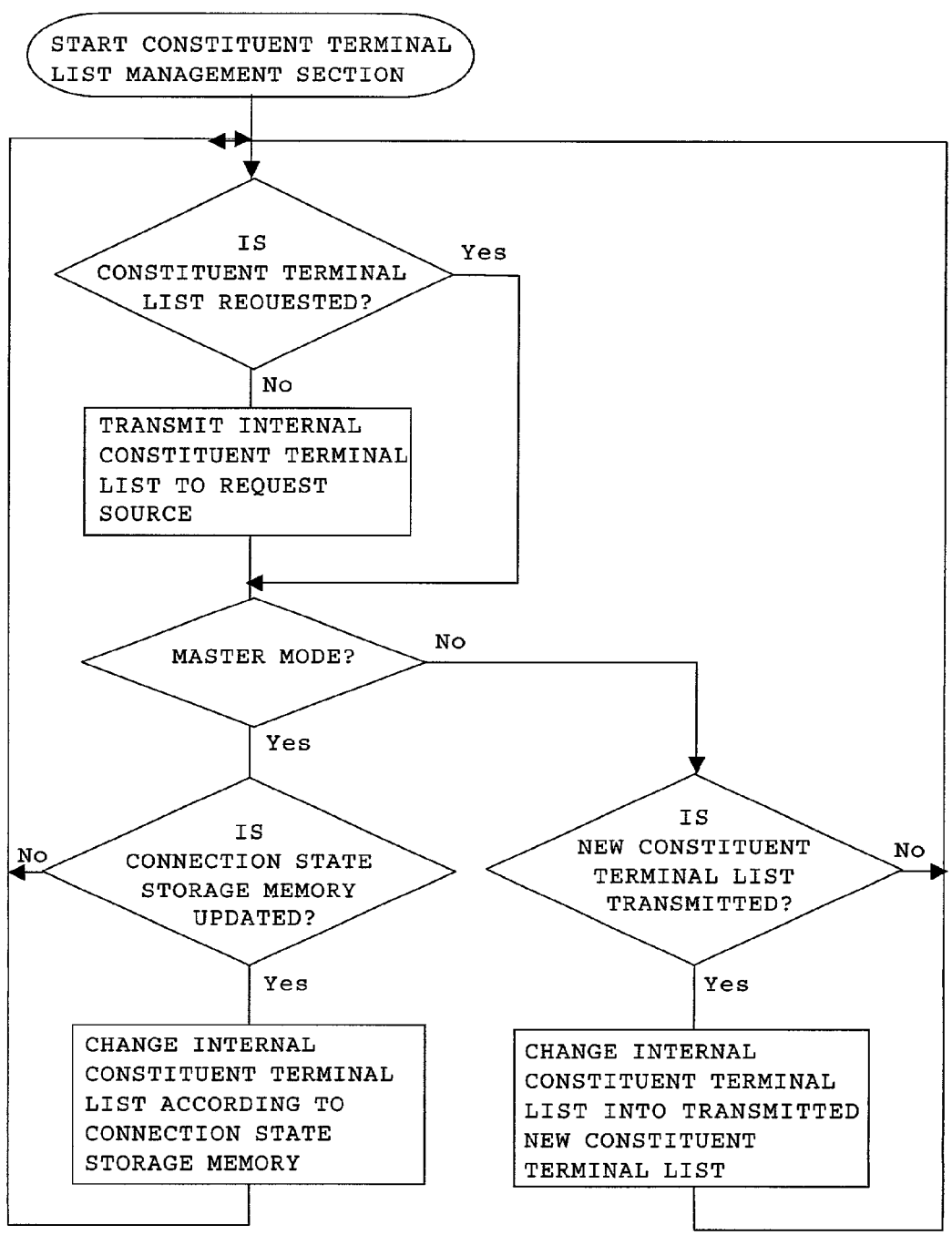
FIG. 8 is a flow chart showing an operation of a constituent terminal list processing section in the radio communication apparatus according to the present invention.

In addition, an operation of the constituent terminal list management section 9 will be described below with reference to the flow chart in FIG. 8. The constituent terminal list management section 9 checks whether the constituent terminal list is requested from other sections or not. When the constituent terminal list is requested, the constituent terminal list management section 9 transmits the constituent terminal list held therein to a request source.

Thereafter, when the constituent terminal list management section 9 is set in the master mode, the constituent terminal list management section 9 checks whether the connection state storage memory 8 is rewritten or not. When the connection state storage memory 8 is rewritten, the constituent terminal list management section 9 rewrites the constituent terminal list held therein to match the constituent terminal list with the connection state storage memory 8.

When the constituent terminal list management section 9 is set in the slave mode, the constituent terminal list management section 9 checks whether a new constituent terminal list is transmitted to the constituent terminal list management section 9 or not. When the new constituent terminal list is transmitted, the constituent terminal list management section 9 replaces the constituent terminal list held therein with the transmitted new constituent terminal list. Thereafter, in any one of the master mode and the slave mode, the control flow returns to the step of checking the presence/absence of a request of a constituent terminal list again.

Figure 9:
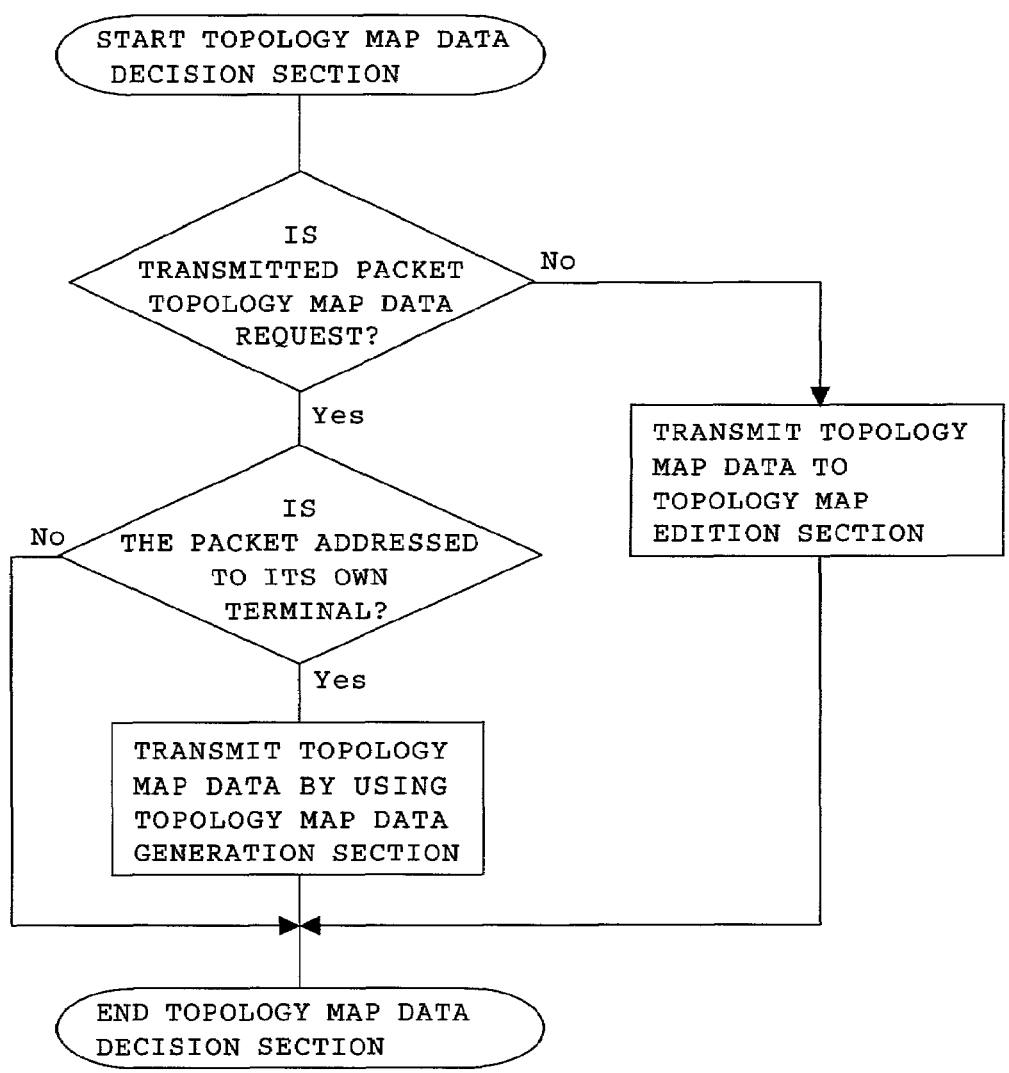
FIG. 9 is a flow chart showing an operation of a topology map data decision section in the radio communication apparatus according to the present invention.

An operation of the topology map data decision section 10 will be described below with reference to the flow chart in FIG. 9. The topology map data decision section 10 receives the contents of a topology map management packet from the reception packet decision section 3. As described above, the topology map management packet includes two types of packets, i.e., a topology map data request packet and a topology map data packet.

When a packet transmitted to the topology map data decision section 10 is a topology map data request packet, and when the packet is addressed to its own terminal, the topology map data decision section 10 transmits the topology map data by using the topology map data generation section 13.

When the packet transmitted to the topology map data decision section 10 is topology map data, the topology map data decision section 10 transmits the topology map data to the topology map edition section 11.

Figure 10:
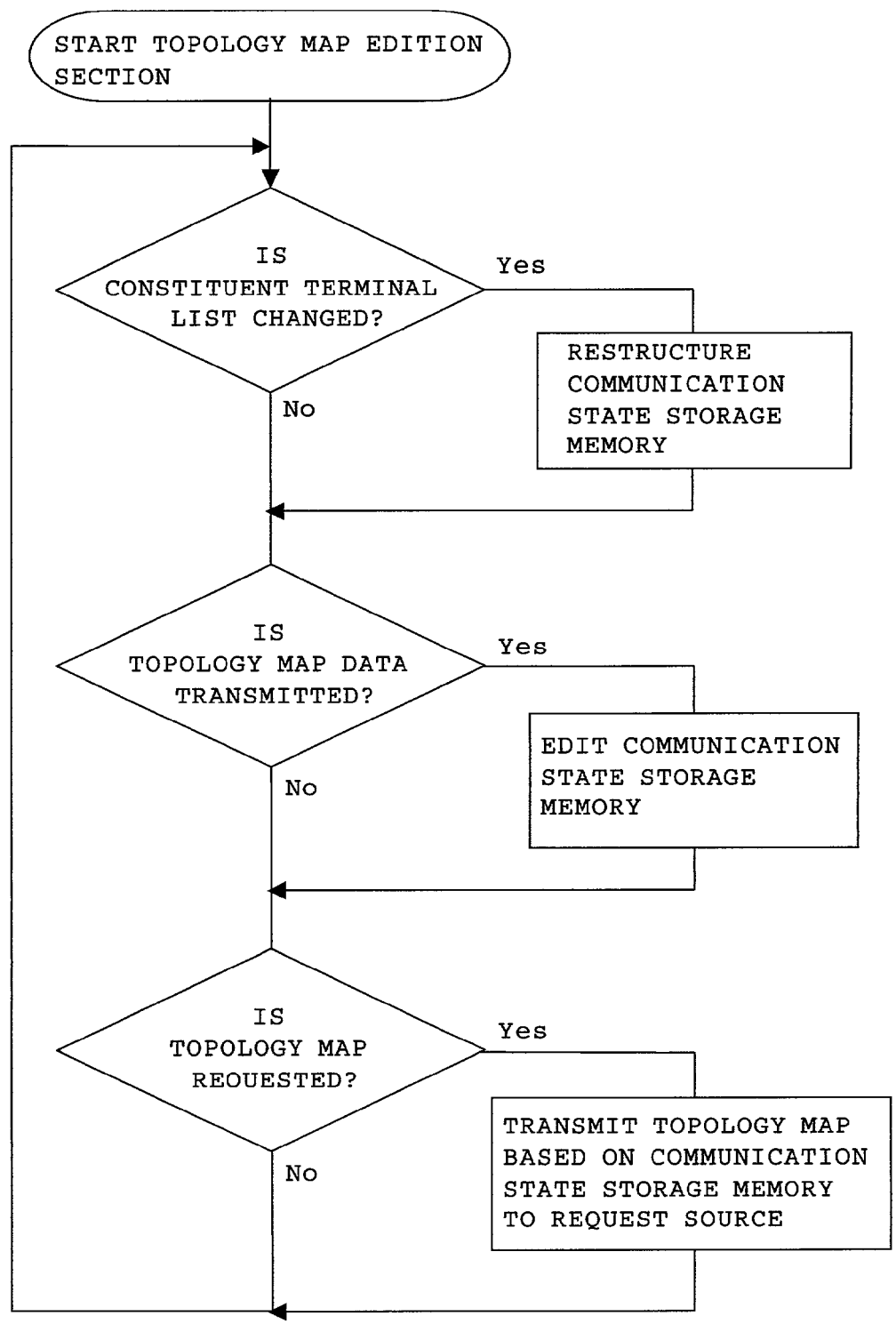
FIG. 10 is a flow chart showing an operation of a topology map edit ion section in the radio communication apparatus according to the present invention.

An operation of the topology map edition section 11 will be described below with reference to the flow chart in FIG. 10. When the constituent terminal list is changed by the constituent terminal list management section 9, the topology map edition section 11 restructures an index part in the communication state storage memory 12 and restructures an item part related to the restructured index part.

When the topology map data is transmitted to the topology map edition section 11, the topology map edition section 11 replaces the part of the corresponding item in the communication state storage memory 12 with the transmitted topology map data, and performs such edition that its own terminal can receives a terminal which transmits topology map data.

In addition, when a topology map is requested, the topology map edition section 11 generates a topology map with reference to the contents of the communication state storage memory 12 and transmits the topology map to the request source.

The communication state storage memory 12 records whether, on the basis of the number of terminals connected to the network and the identifiers of the terminals which are read from the constituent terminal list management section 9 through the topology map edition section 11, as shown in FIG. 11, transmission and reception between the terminals can be performed or not.

In FIG. 11, OK represents that the transmission and reception between the terminals can be performed, and NG represents that the transmission or reception or both of the transmission and reception between the terminals cannot be performed.

When the topology map edition section 11 restructures the index part such that the number of constituent terminals increases, as shown in FIG. 12, an index is added, and data which means uncertainty is inserted into the corresponding item part. In FIG. 12, Unknown represents that the terminal is uncertain.

For this reason, when the index part is to be reedited to decrease the number of terminals, as shown in FIG. 13, the index part of a terminal to be erased is set in a non-used state, and items related to the terminal are also set in a non-used state. In FIG. 13, Non-used represents that the corresponding terminal is in a non-used state.

This is because an operation of moving the contents of the items in the communication state storage memory 12 is minimized when the number of terminals is reduced. Thereafter, when a terminal is added, a part set in a non-used state is also used to suppress the items in the communication state storage memory 12 in the communication state storage memory 12 in the addition of the terminal from moving.

Figure 14:
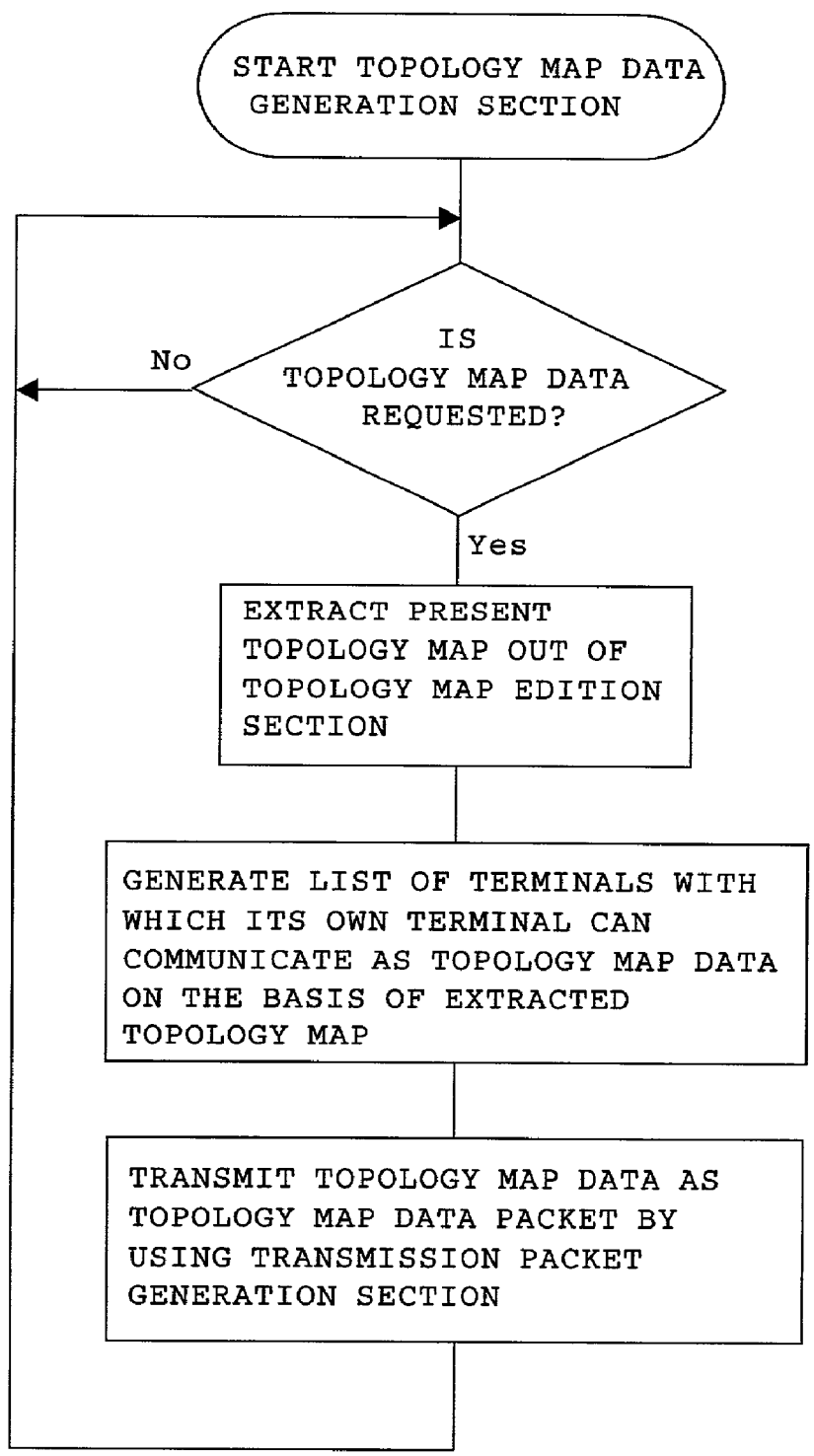
FIG. 14 is a flow chart showing an operation of a topology map data generation section in the radio communication apparatus according to the present invention.

An operation of the topology map data generation section 13 will be described below with reference to the flow chart in FIG. 14. The topology map data generation section 13 checks whether a topology map data is requested or not. When the topology map data is requested, the topology map at the present is extracted from the topology map edition section 11.

On the basis of the extracted topology map, a list of terminals with which its own terminal can communicate is further extracted to generate topology map data. The topology map data is transmitted as a topology map data packet by using the transmission packet generation section 4.

In this case, the topology map data is generated such that the topology map is changed into a bit field. In this case, it is assumed that a status in the topology map data is expressed by 1 byte. When the topology map data is made from the topology map, the list of terminals with which its own terminal can communicate is cut out of the topology map, and bit field data is generated by using the 1-byte status.

Figure 15:
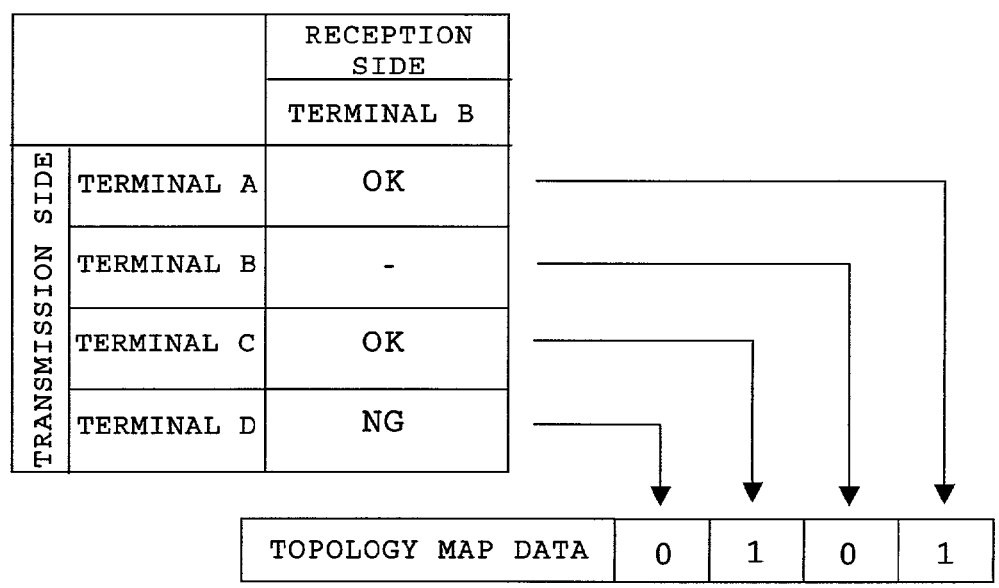
FIG. 15 is a diagram for explaining a generation example of topology map data in the radio communication apparatus according to the present invention.

FIG. 15 illustrates bit field data are formed such that the bit field data the status of which is OK is represented by 1 and the bit field data the status of which is not OK is represented by 0. In this case, since the topology map serving as an original indicates communication states between four terminals, 12-byte (=4^2−4) recording elements are necessary. However, the topology map data has a size of only 4 bits.

Figure 16:
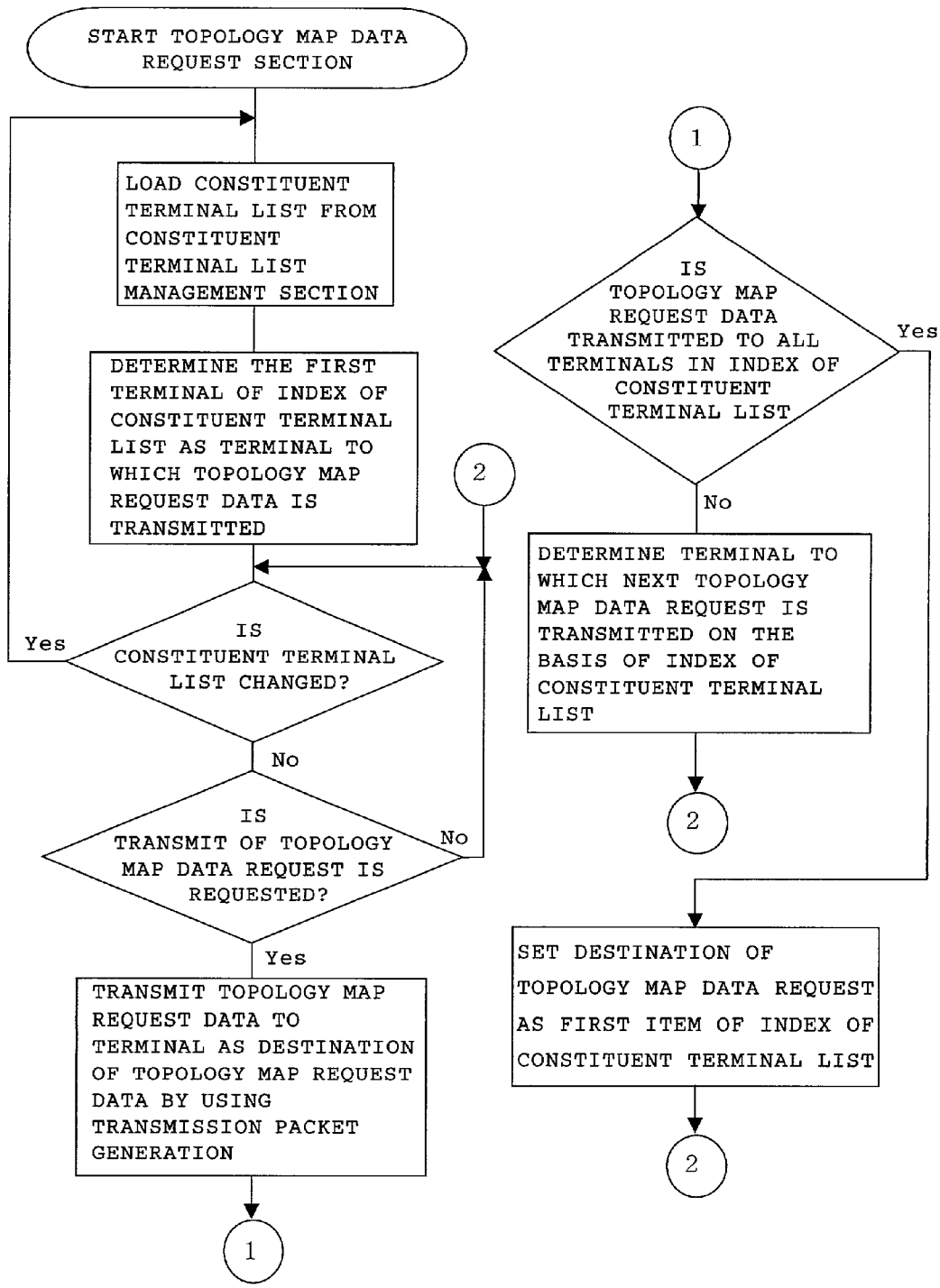
FIG. 16 is a flow chart showing an operation of a topology map data request section in the radio communication apparatus according to the present invention.

In addition, an operation of the topology map data request section 14 will be described below with reference to the flow chart in FIG. 16. The topology map data request section 14 loads a constituent terminal list from the constituent terminal list management section 9 in an initial state, and a terminal firstly registered in the loaded constituent terminal list is set as a destination terminal of a topology map data request at the first.

It is assumed that this operation is performed each time the constituent terminal list is updated. When transmission of a topology map data request is requested from the outside, the topology map data request data is transmitted to a terminal determined as a destination of the topology map data request at the present.

After the topology map data request is transmitted, it is checked whether the topology map data request is transmitted to all the terminals in the index of the constituent terminal list or not. When the topology map data request is not transmitted to all the terminals, a destination of the next topology map data request is set as the next terminal on the index of the constituent terminal list.

When the topology map data request is transmitted to all the terminals, the first terminal on the index of the constituent terminal list is set as a destination of the next topology map data request. After these operations, the radio communication apparatus waits until the radio communication apparatus receives a transmitted topology map data request again.

In the radio communication apparatus which performs the above operation, a topology map is managed by the following processes.

More specifically, when a radio network is structured, a terminal which is powered on at the first confirms that a network management beacon is not transmitted from the other terminals for a predetermined period of time, and is set in a master mode, so that management of the terminal constituting the network and management of the beacon are performed. The terminal which is set in the master mode outputs a network management beacon at predetermined intervals.

At the start of a terminal, when a network management beacon is detected within a predetermined period of time, the terminal is set in a slave mode. In order to connect the terminal set in the slave mode to the network, a network connection request must be output to the terminal set in the master mode.

The terminal which is set in the master mode and which receives a network connection request notifies a request source that connection is succeeded when the terminal of the request source can be connected to the network, and the terminal records the identifier of the request source in the connection state storage memory 8. Immediately after the recording, the terminal transmits the latest constituent terminal list formed by using the constituent terminal list management section 9 to all the terminals connected to the network.

Similarly, the terminal which is set in the master mode and which receives a disconnect request from a terminal connected to the network notifies the request source that disconnection is succeeded, and the identifier of the request source is erased from the connection state storage memory 8. Immediately after the erasing, the terminal transmits the latest constituent terminal list formed by using the constituent terminal list management section 9 to all the terminals connected to the network.

These operations are repeated, so that all the terminals connected to the network can share the same constituent terminal list.

In the state in which all the terminals share the same constituent terminal list, the terminal set in the master mode selects a certain terminal from the constituent terminal list and requests topology map data.

Figures 17, 18:
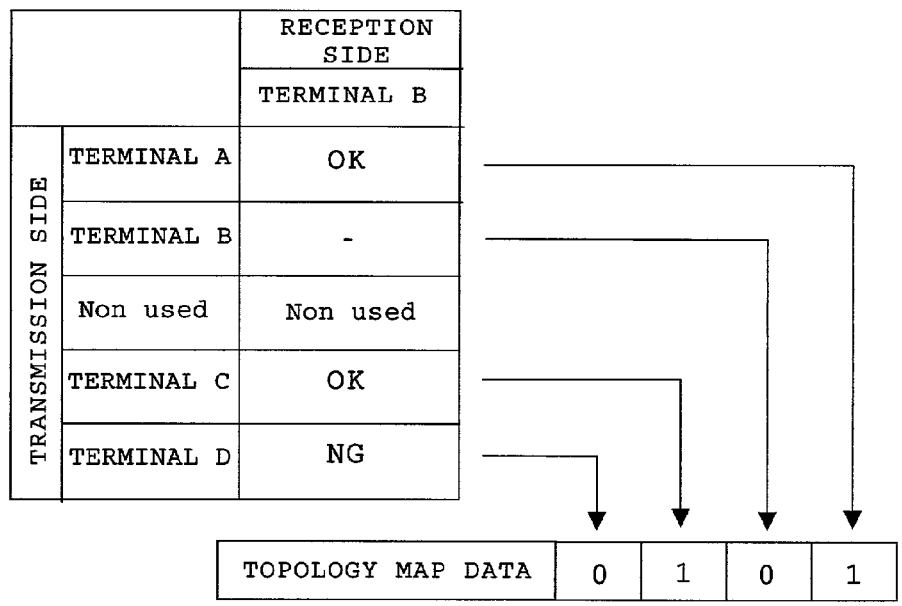
FIG. 17 is a diagram for explaining an example of a topology map.
FIG. 18 is a diagram showing an example of handling of a non-used field.

The terminal which receives a request extracts a terminal with which its own terminal can communicate, as shown in FIG. 15, generates topology map data which is bit map data, and transmits the topology map data to all the terminals. The topology map data is smaller than a topology map itself as described above. When the Non-used field is included in the constituent terminal list, the field is skipped to generate topology map data. This manner is shown in FIG. 18.

When the terminal which requests the request of topology map data receives topology map data transmitted from a terminal which receives the request of topology map data. On the basis of the received topology map data, the terminal updates the topology map data recorded in the communication state storage memory 12 in its own terminal by using the topology map edition section 11.

A predetermined period of time after, the terminal set in the master mode requests topology map data from the next terminal which is designated by using the topology map data request section 14. The designated terminal transmits the topology map data.

A terminal which is not designated receives topology map data transmitted from a terminal which is designated to transmit topology map data. On the basis of the received topology map data, the terminal updates the topology map data recorded in the communication state storage memory 12 in its own terminal by using the topology map edition section 11.

In order to complete a topology map in the entire network, the above operations must be performed for all the terminals connected to the network. However, when the processes for managing topology maps are performed simultaneously with transmission of a beacon for network management, useless processes can be minimized.

In the radio network of this type, in general, a beacon is transmitted at intervals of about 10 msec or less. In consideration of the processes for each beacon, it is assumed that each terminal performs polling once a second. In this case, 100 or more terminals can be accommodated in the same network. In this manner, the management of a topology map may be divided into parts the number of which depends on the number of constituent terminals.

The above operations are repeated times the number of which is equal to the number of terminals connected to the network and set in a slave mode, so that a topology map which can decide whether direct communication with its own terminal can be performed or not in all the terminals connected to the network. When the series of operations are repeated again, a topology map corresponding to a communication state which changes with time can be continuously updated in each terminal.

Unlike the method, which is described in Japanese Patent Application Laid-Open No. 9-186690, of sequentially transmitting identification code lists from all the terminals, data transmitted at once are data for request topology map data and topology map data, and, therefore, a time until a timeout can be set to be short. For this reason, a time required to manage topology maps can be shortened.

More specifically, since a unit time required to manage topology maps can be set to be short, a communication bandwidth used for topology management can be reduced. In addition, since a terminal set in a master mode can control transmission and reception timings of information for managing all topology maps, the information is prevented from broken by collision.

In the above working, in the terminal set in the master mode and used when all terminals set in the slave mode are connected to the network can receive topology map data of all the terminals. For this reason, bi-directional topology maps for all the terminals can be constituted.

Therefore, when it is determined that terminals set in the slave mode can directly communicate with each other, a terminal with which its own terminal can directly communicate is selected by using the information processing device 15 of the terminal in the master mode, and a communication path which passes through the terminal is set, so that efficient communication can be performed.

INDUSTRIAL APPLICABILITY

As has been described above, according to the radio communication apparatus and the radio communication method according to the present invention, by exchanging only topology map data of a bit field data form which is considerably smaller than a topology map representing communication states of all terminals constituting a radio network, the communication states between the terminals changed on real time can be reflected on communication states between the terminals stored in its own terminal.

In this manner, a communication bandwidth required to manage topology maps can be reduced, and transmission and reception timings of information for managing the topology maps are controlled, so that the information can be prevented from being broken by collision.

The invention claimed is:

1. A radio communication apparatus which dynamically seizes a communication state between a plurality of mobile terminals constituting a radio network and which dynamically changes communication paths depending on a communication state between the terminals at the present, comprising:

means for holding a constituent terminal list formed on the basis of the number of terminals connected to the radio network at the present and identifiers or the terminals;

means for sequentially designating the terminals connected to the radio network;

means for requesting topology map data which is bit field data formed on the basis of a communication state between the terminals and the constituent terminal list;

means for receiving the request of the topology map data;

means for deciding whether the request of the topology map data is for its own terminal or not;

means for, when the request of the topology map data is for its own terminal, transmitting the topology map data viewed from its own terminal; and means for, when the request of the topology map data is not for its own terminal, receiving topology map data transmitted from another terminal from which topology map data is requested to reflect the topology map data on the communication state between the terminals stored in its own terminal.

2. A radio communication method which dynamically seizes a communication state between a plurality of mobile terminals constituting a radio network and which dynamically changes communication paths depending on a communication state between the terminals at the present, comprising the steps of:

causing each of the terminals to hold a constituent terminal list formed on the basis of the number of terminals connected to the radio network at the present and identifiers of the terminals;

causing one of the plurality of terminals that is set in a master mode to sequentially designate terminals in a slave mode connected to the radio network;

causing the terminal in the master mode to request from the designated terminal in the slave mode topology map data which is bit field data formed on the basis of a communication state between the terminals and the constituent terminal list;

causing the terminals in the slave mode to transmit the topology map data viewed from its own terminal to the terminal in the mast mode when the request of the topology map data is for its own terminal; and causing each of the terminals in the slave mode to receive the topology map data transmitted from another requested terminal in the slave mode to the terminal in the master mode to reflect a communication state between the terminals stored in its terminal when the request of the topology map data is not for its own terminal.

3. A radio communication method which dynamically seizes a communication state between a plurality of mobile terminals constituting a radio network and which dynamically changes communication paths depending on a communication state between the terminals at the present, comprising the steps of:

causing each of the terminals to hold a constituent terminal list formed on the basis of the number of terminals connected to the radio network at the present and identifiers of the terminals;

sequentially designating the terminals connected to the radio network;

requesting topology map data which is bit field data formed on the basis of a communication state between the terminals and the constituent terminal list;

receiving the request of the topology map data;

deciding whether the request of the topology map data is for its own terminal or not;

when the request of the topology map data is for its own terminal, transmitting the topology map data viewed from its own terminal; and when the request of the topology map data is not for its own terminal, receiving topology map data transmitted from another terminal from which topology map data is requested to reflect the topology map data on the communication state between the terminals stored in its own terminal.

* * * * *